July 16, 1957 H. G. GROEHN 2,799,305
WORKTABLE AND ADJUSTABLE FENCE FOR SMALL POWER TOOLS
Filed Dec. 2, 1954 2 Sheets-Sheet 1

INVENTOR.
Harvey G. Groehn.
BY
Harness, Dickey & Pierce.
ATTORNEYS.

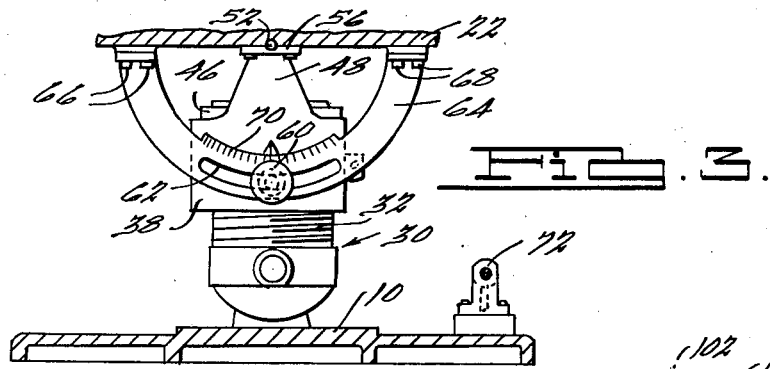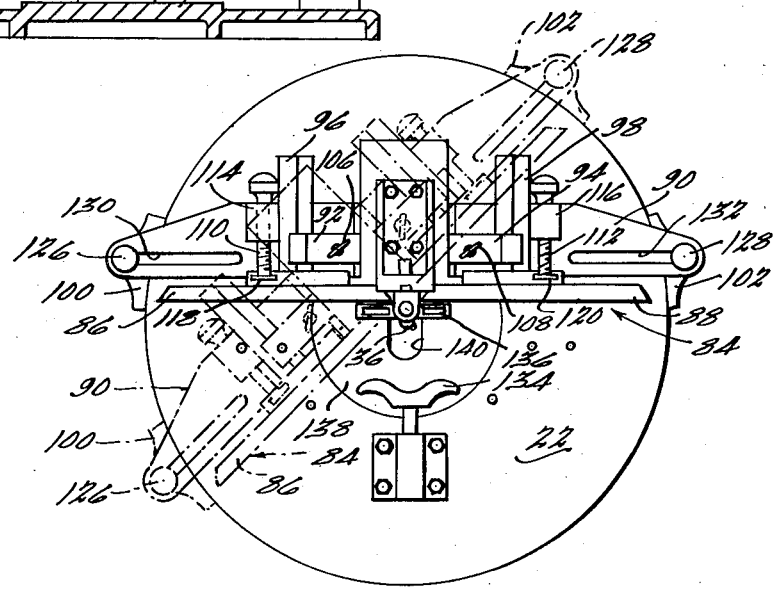

United States Patent Office 2,799,305
Patented July 16, 1957

2,799,305

WORKTABLE AND ADJUSTABLE FENCE FOR SMALL POWER TOOLS

Harvey G. Groehn, Detroit, Mich.

Application December 2, 1954, Serial No. 472,607

8 Claims. (Cl. 144—253)

This invention relates to new and useful improvements in power tools.

Power-operated woodworking tools of a type incorporating a number of different individual tools in a single common structure have become popular, and it is to this particular type of tool that the instant invention is particularly related. More specifically, the invention provides a basic support on which a plurality of standard hand-operated power-driven tools can be mounted and which provides a novel worktable and fence arrangement for supporting and guiding a workpiece in use.

In the drawings forming a part of this specification and wherein like numerals are employed to designate like parts throughout the same:

Fig. 3 is a fragmentary, vertical, sectional view taken on the line 3—3 of Fig. 2;

Fig. 4 is a plan view similar to Fig. 1 illustrating the manner in which the fence or guide is adjustable on the worktable; and Fig. 5 is a perspective view of the tool.

Figure 1:
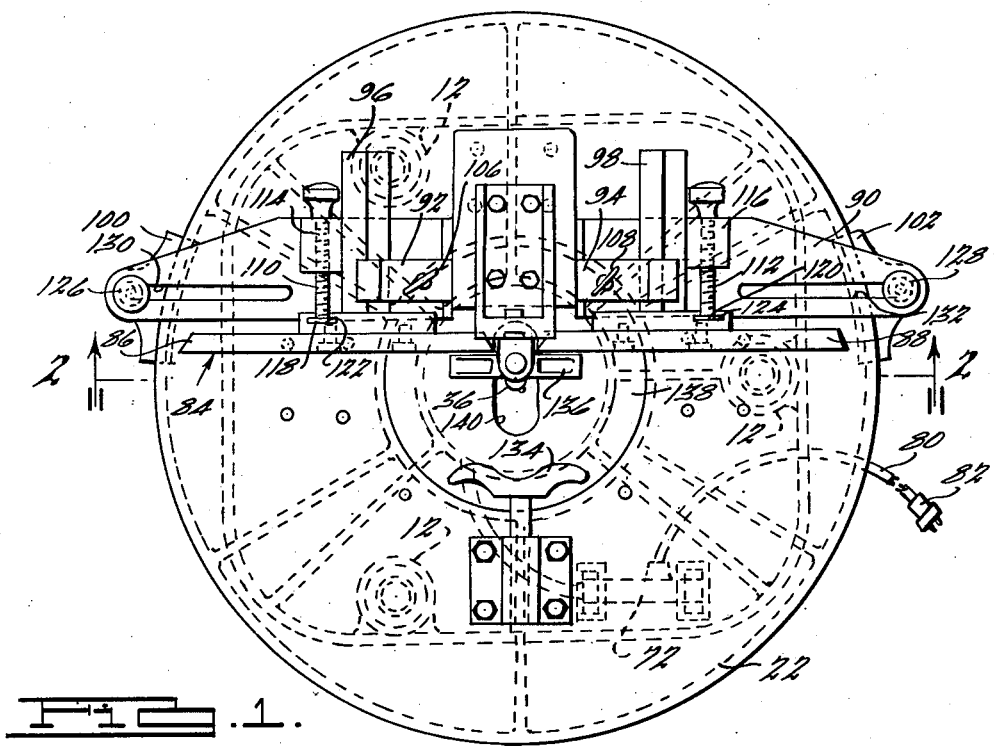
Fig. 1 is a top plan view of a tool embodying the invention.

In the drawings, wherein for the purpose of illustration is shown a preferred embodiment of the invention, the numeral 10 designates a base having a plurality of upright supports 12 thereon. Three such supports are here shown but it will be readily apparent that any suitable number can be used. In the particular embodiment of the invention illustrated by the drawings, the base 10 and supports 12 are made as a single casting so that the supports are integral with the base and the supports are hollow to accommodate vertically adjustable screws 14. The screws 14 extend into the supports 12 through bushings 16 provided in the upper ends of the supports, and the screws are vertically adjusted and held in selected, adjusted positions by nuts 18 and lock nuts 20.

A circular worktable 22 is mounted on the upper ends of the screws 14, and any suitable or conventional means may be employed for fastening the table to the screws. In the particular construction here shown by way of example, the screws 14 are formed with upstanding studs 24 which are screwed into embossments 26 on the underside of the table 22 and prevented from disengaging the table by lock nuts 28. The screws 14 are individually adjustable to position the table 22 and preferably to position it exactly horizontal.

The supporting screws 14 hold the table 22 spaced sufficiently above the base 10 to accommodate a standard motor-driven power tool such as the one shown at 30. The particular tool here shown by way of example has an externally threaded motor housing 32 and a driven chuck 34 which carries a routing tool 36. According to the present invention, the motor housing 32 is held by a generally circular split strap 38, and the size of the strap is adjustable at least to a limited extent, by a screw 40 carried by lugs 42 and 44 on the ends of the strap. A nut 46 threaded on the housing 32 supports the motor unit and the tool 36 carried thereby on the strap. At diametrically opposite sides of the tool-carrying strap 38 are upstanding arms 48 and 50 having outwardly directed trunnions 52 and 54 respectively which are journaled in bearings 56 and 58 on the undersurface of the table 22. The strap 38 and power tool carried thereby are free to swing on the journals 52 and 54 to position the tool 36 at a desired angle with respect to the table 22, and the tool is held at the selected angle by a screw 60 which extends into the strap 38 through an arcuate slot 62 in a vertical bracket 64 fastened to the undersurface of the table 22 by screws 66 and 68. When the screw 60 is loose, the strap 38 is free to swing the power tool within limits defined by the slot 62; and, when the screw is tightened, it holds the strap and its adjuncts in a selected, angularly adjusted position. If desired, a scale 70 can be provided on the bracket 64 as shown in Fig. 3 to assist the user in positioning the tool in a desired, angular position.

The above construction has the advantage of providing interchangeable power tools, as there are a large number of standard, motor-driven, hand-operated tools readily available on the market capable of performing a large number of operations such as drilling, sawing, milling, routing, and grinding. Power to the tool 30 can of course be controlled in any suitable manner. In the particular arrangement shown, the pistol-grip handle 72, with which power tools of the type shown are conventionally equipped, is removed from the motor case 32 and fastened to mounting blocks 74 and 76 on the base 10, as shown in Fig. 5. The handle conventionally is equipped with a manually operable switch 78 which controls the flow of power to the motor, and a power-supply line 80 supplies the switch and the motor and is equipped with a plug 82 for connection to a wall socket.

In order to guide a workpiece relative to the cutting tool 36 the table 22 is provided with a fence 84 consisting of spaced, aligned fence members 86 and 88. A support 90 on the table 22 is provided with clamps 92 and 94 which receive rearward extensions 96 and 98 on the fence members 86 and 88, and the support in turn is connected to mounting brackets or guides 100 and 102 which interengage and travel along a way 104 which extends entirely around the table 22 at the periphery thereof.

The clamps 92 and 94 are selectively engaged with and disengaged from the extensions 96 and 98 by thumb nuts 106 and 108. When the thumb nuts are loosened, the fence members 86 and 88 are individually adjustable horizontally across the table 22 and relative to the support 90; and when the thumb nuts are tightened, they hold the fence pieces in selected adjusted positions. Adjusting screws 110 and 112 extending through and threadedly engaging bearing blocks 114 and 116 on the support 90 have radially enlarged ends 118 and 120 disposed in T slots 122 and 124 in the fence members 86 and 88. The T slots 118 and 120 permit the screws to turn readily relative to the fence members, and turning of the screws adjusts the fence members relative to the support 90.

Figure 2:
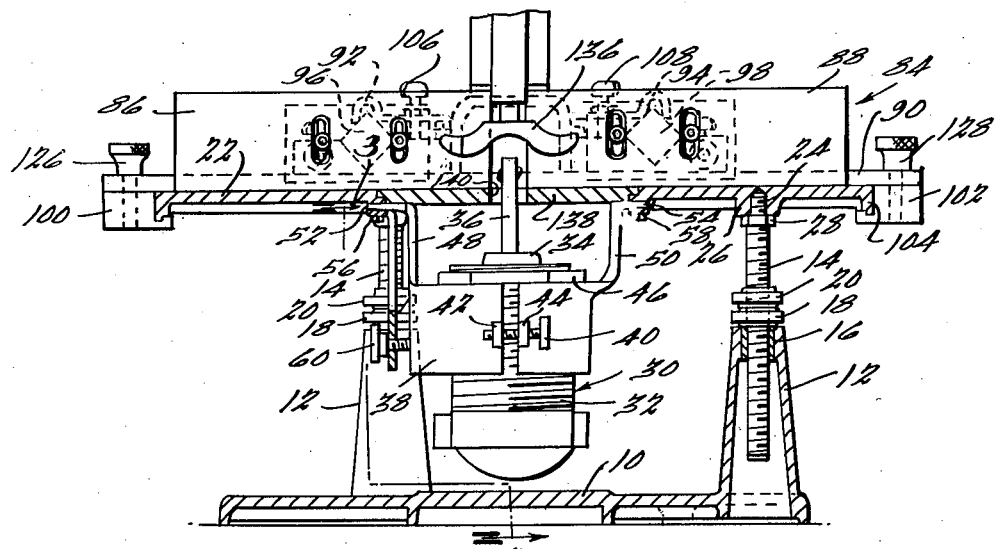
Fig. 2 is a vertical sectional view taken on the line 2—2 of Fig. 1.

The way 104 preferably is in the form of a depending flange which extends entirely around the periphery of the table 22, and the brackets 100 and 102 extend under the table and engage over the flange, as perhaps best shown in Fig. 2, to hold the brackets associated with the table and at the same time permit the brackets to slide readily on the flange. Thumb screws 126 and 128 extending through elongated slots 130 and 132 in the support 90 fasten the parts together and at the same time permit the brackets to move freely relative to the support.

Thus, the support 90 can be moved to any selected, angularly adjusted position on the table, as illustrated by the full-line position and broken-line position in Fig. 4, and the support also can be moved radially to a desired position on the table. Radial movement of the support, viz., movement thereof to and from the center of the table, is always accompanied by some relative movement between the support and the brackets 100 and 102. As the support moves away from the center of the table the screws 126 and 128 move inwardly in slots 130 and 132, and as the support moves toward the center of the table the screws move outwardly in the slots. Any combination of angular and radial adjustment of the support is thus permitted, and the support can be held in a selected adjusted position by tightening thumb screws 126 and 128. Manifestly, adjustment of the support 90 also adjusts the fence 84 which in turn supports and guides a workpiece relative to the cutting tool 36.

If desired, the table 22 can be provided with an adjustable work-supporting and guiding member 134, and the support 90 can be provided with a similar vertically adjustable member 136 to assist in holding and/or positioning a workpiece relative to the cutting tool.

The table 22 preferably is provided with a removable center portion 138 having an opening 140 through which the cutting tool 36 extends. By making the center of the table removable in this manner it is possible to provide a number of different inserts having different shaped openings adapted to accommodate various types of tools that can be incorporated in the construction. In this manner the versatility of the apparatus is enhanced and the utility thereof to the user is materially increased.

Having thus described the invention, I claim:

1. A worktable for power tools and the like, said table having a flat top surface and an annular way, an upright fence on said table, support means for said fence, and mounting brackets connected to and movable on said way and longitudinally adjustably connected to said support means, said brackets being movable on said way entirely around said table and said support means being independently movable radially of said table and longitudinally of itself and rotatably relative to said brackets, whereby to permit adjustment of said fence entirely around, over the top of and transversely across said table.

2. The combination as set worth in claim 1 wherein said table is circular in shape and said way comprises a depending annular flange at the periphery of said table, wherein said brackets interfit with said flange to connect the brackets to the table.

3. The combination as set forth in claim 1 wherein said fence is independently adjustable relative to said support and transversely across of said table.

4. A power tool comprising a base, vertically adjustable standards on said base, a table carried by said standards, said table having a flat top surface and a depending, circular, peripheral flange, mounting brackets interengaging with said peripheral flange and movable thereon around said table, a support on the table overlying said mounting brackets, pin-and-slot connections fastening said mounting brackets to said support holding said brackets interengaged with the flange while permitting said brackets to move on said flange and also permitting said support to move radially and circumferentially on the table and relative to said mounting brackets, and a vertical fence on the table carried by said support.

5. A power tool comprising a base, vertically adjustable standards on said base, a table carried by said standards, said table having a flat top surface and a depending, circular, peripheral flange, mounting brackets interengaging with said peripheral flange and movable thereon around said table, a support on the table overlying said mounting brackets, pin-and-slot connections fastening said mounting brackets to said support holding said brackets interengaged with the flange while permitting said brackets to move on said flange and also permitting said support to move radially and circumferentially on the table and relative to said mounting brackets, spaced aligned fence members on said table and adjustably connected to said support, adjusting screws carried by the support and connected to said fence members for individually adjusting said members relative to the support, and clamp means carried by the support and engaging said fence members to hold the same in selected adjusted positions.

6. A power tool including a table having a flat top surface and a depending, circular, peripheral flange, mounting brackets interengaging with said peripheral flange and movable thereon around said table, a support on the table overlying said mounting brackets, pin and slot connections fastening said mounting brackets to said support holding said brackets interengaged with the flange while permitting said brackets to move on said flange and also permitting said support to move radially and circumferentially on the table and relative to said mounting brackets, and a vertical fence on the table and carried by said support.

7. A power tool including a flat circular table having a depending, annular, peripheral flange, mounting brackets mounted to travel on said flange movable around said table, fence supporting means on the table, and means fastening said supporting means to said mounting brackets holding the latter interengaged with the flange while permitting said brackets to move on the flange and also permitting said supporting means to move radially and circumferentially on the table longitudinally of itself and rotatably relative to said mounting brackets.

8. A power tool including a flat circular table having a depending, annular, peripheral flange, brackets mounted to travel on said flange movable around said table, fence supporting means on the table pivotally and slidably connected to said brackets, a pair of aligned fence members on said table adjustably connected to said fence supporting means, adjusting screws carried by said supporting means and connected to said fence members for individually adjusting the latter relative to said support, and clamp means carried by the support and engaging said fence members to hold the same in selected adjusted positions.

References Cited in the file of this patent

UNITED STATES PATENTS

| | | |
|---|---|---|
| 206,360 | Shimer | July 23, 1878 |
| 221,818 | Holden | Nov. 18, 1878 |
| 1,989,285 | Merrigan | Jan. 29, 1935 |
| 2,374,286 | Hargadon | Apr. 24, 1945 |
| 2,488,077 | Buday | Nov. 15, 1949 |